(12) United States Patent
Huang et al.

(10) Patent No.: US 11,290,209 B2
(45) Date of Patent: Mar. 29, 2022

(54) WIRELESS COMMUNICATION METHOD AND WIRELESS COMMUNICATION DEVICE WHICH USES THE WIRELESS COMMUNICATION METHOD

(71) Applicant: Audiowise Technology Inc., Hsinchu (TW)

(72) Inventors: Chun-Yuan Huang, Hsinchu (TW); Jeng-Hong Chen, Sunnyvale, CA (US); Hsinhsiang Liu, Sunnyvale, CA (US); Kuang-Hu Huang, Hsinchu (TW)

(73) Assignee: Audiowise Technology Inc., Hsinchu (TW)

( * ) Notice: Subject to any disclaimer, the term of this patent is extended or adjusted under 35 U.S.C. 154(b) by 0 days.

(21) Appl. No.: 16/931,461

(22) Filed: Jul. 17, 2020

(65) Prior Publication Data

US 2022/0021480 A1 Jan. 20, 2022

(51) Int. Cl.
*H04L 1/00* (2006.01)
*H04W 28/04* (2009.01)
*H04M 1/60* (2006.01)

(52) U.S. Cl.
CPC .......... *H04L 1/0061* (2013.01); *H04L 1/0072* (2013.01); *H04L 1/0083* (2013.01); *H04M 1/6066* (2013.01); *H04W 28/04* (2013.01)

(58) Field of Classification Search
None
See application file for complete search history.

(56) References Cited

U.S. PATENT DOCUMENTS

| | | | | |
|---|---|---|---|---|
| 5,968,197 A | * | 10/1999 | Doiron | H04L 1/1845 714/748 |
| 2010/0269005 A1 | * | 10/2010 | Budampati | H04L 1/1845 714/746 |
| 2016/0365948 A1 | * | 12/2016 | Kalle | G06F 11/1004 |
| 2017/0338835 A1 | * | 11/2017 | Priller | H03M 13/15 |
| 2020/0252162 A1 | * | 8/2020 | Denboer | H04L 1/189 |

* cited by examiner

*Primary Examiner* — Anh Vu H Ly
(74) *Attorney, Agent, or Firm* — Winston Hsu

(57) ABSTRACT

A non-transitory computer readable medium storing at least one program, wherein a wireless communication method is performed while the program is executed. The wireless communication method comprises: (a) receiving a plurality of data groups, wherein the data groups do not pass an error checking procedure; (b) selecting a portion of at least one of the data groups; and (c) reconstructing a reconstruction data group based on the portions selected in the step (b).

14 Claims, 6 Drawing Sheets

WIRELESS COMMUNICATION METHOD AND WIRELESS COMMUNICATION DEVICE WHICH USES THE WIRELESS COMMUNICATION METHOD

BACKGROUND OF THE INVENTION

1. Field of the Invention

The present invention relates to a wireless communication method and a wireless communication device, and particularly relates to a wireless communication method and a wireless communication device which can reconstruct error packets to a complete packet.

2. Description of the Prior Art

TWS (True Wireless Stereo) wireless earphones become more and more popular recently. Such earphone has the advantages of a beautiful appearance and a small size. However, the available space for an antenna in the earphone is also limited due to the small size of the TWS wireless earphone, thus the receiving ability of the antennas may be limited as well. Such issue may suppress the performance of the TWS wireless earphone. For example, the antenna may receive only portion data of a packet while receiving the packet, due to the limited receiving ability.

SUMMARY OF THE INVENTION

One objective of the present invention is to provide a non-transitory computer readable medium storing at least one program, wherein a wireless communication method is performed while the program is executed. The wireless communication method can reconstruct a complete packet based on error packets.

Another objective of the present invention is to provide a wireless communication device which can reconstruct a complete packet based on error packets.

One embodiment of the present invention is to provide a non-transitory computer readable medium storing at least one program, wherein a wireless communication method is performed while the program is executed. The wireless communication method comprises: (a) receiving a plurality of data groups, wherein the data groups do not pass an error checking procedure; (b) selecting a portion of at least one of the data groups; and (c) reconstructing a reconstruction data group based on the portions selected in the step (b).

Another embodiment of the present invention is to provide a wireless communication device, comprising: a control circuit; and a storage device, configured to store at least one program. A wireless communication method is performed while the program is executed by the control circuit, and the wireless communication method comprises: (a) receiving a plurality of data groups by the control circuit, wherein the data groups do not pass an error checking procedure; (b) selecting a portion of at least one of the data groups; and (c) reconstructing a reconstruction data group based on the portions selected in the step (b).

In view of above-mentioned embodiments, the packet can be reconstruct based on error packets, thus the performance of the TWS wireless earphone or any other electronic device with a small size can be improved.

These and other objectives of the present invention will no doubt become obvious to those of ordinary skill in the art after reading the following detailed description of the preferred embodiment that is illustrated in the various figures and drawings.

DETAILED DESCRIPTION

Several embodiments are provided in following descriptions to explain the concept of the present invention. Each component in following descriptions can be implemented by hardware (e.g. a device or a circuit) or hardware with software (e.g. a program installed to a processor). Besides, the method in following descriptions can be executed by programs stored in a non-transitory computer readable recording medium such as a hard disk, an optical disc or a memory. Besides, the term "first", "second", "third" in following descriptions are only for the purpose of distinguishing different one elements, and do not mean the sequence of the elements. For example, a first device and a second device only mean these devices can have the same structure but are different devices. Additionally, the component in each embodiment can be classified to more components or be integrated to fewer components.

Figure 1:
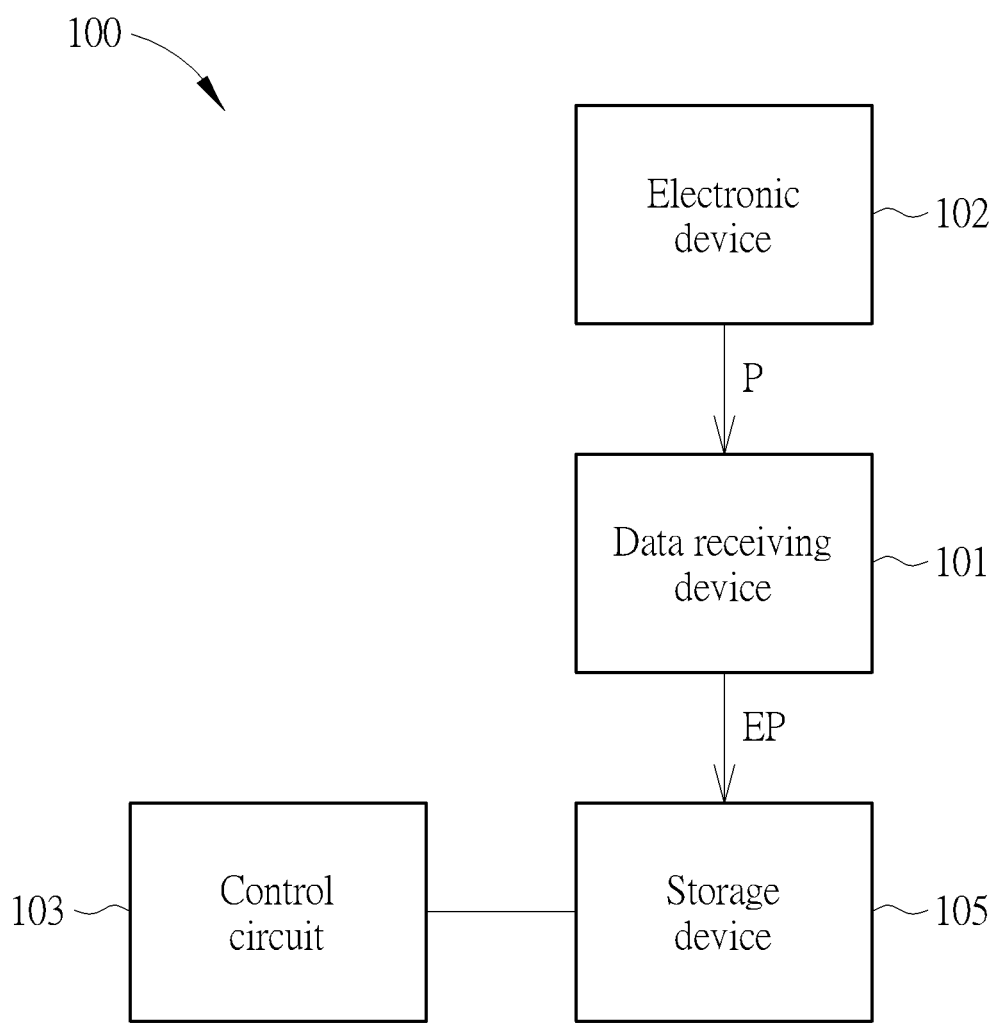
FIG. 1 is a block diagram illustrating a wireless communication device according to one embodiment of the present invention.

FIG. 1 is a block diagram illustrating a wireless communication device 100 according to one embodiment of the present invention. As illustrated in FIG. 1, the wireless communication device 100 comprises a data receiving device 101, a control circuit 103 and a storage device 105. The data receiving device 101, such as an antenna, can receive a packet P from an electronic device 102. After receiving the packet P, the control circuit 103 is configured to execute at least one program to perform following operations. The program can be stored any recording medium, such as but not limited to the storage device 105.

In one embodiment, the control circuit 103 determines whether the packet P is an error packet or not. If the packet P is an error packet, the packet P is buffered to the storage device 105. In one embodiment, the control circuit 103 performs an error checking procedure such as CRC (Cyclic Redundancy Check) to check whether the packet P is an error packet or not. If the packet P does not pass the error checking procedure, the packet P is determined as an error packet. Please note the error checking procedure can be any other procedure rather than limited to CRC. Also, the error packet can mean, for example, the packet P does not have data which is supposed to be contained in the packet P.

If the packet P is determined as an error packet, it is buffered to the storage device 105, the control circuit 103 requests the electronic device 102 which transmits the packet P to re-transmit the packet P again. That is, if a packet received by the data receiving device 101 is an error packet, the error packet is buffered to the storage device 105 and the control circuit 103 will request the electronic device 102 to transmit the same packet again. In one embodiment, such steps will be repeated until a number that the same packet is determined as an error packet reaches a predetermined number. In one embodiment, the wireless communication device 100 is a Bluetooth device, and the packet is re-transmitted while the wireless communication device 100 using ACL (Asynchronous Connectionless Link protocol).

If a number that the same packet is determined as an error packet reaches a predetermined number (in following examples, 3 or 5), which also means a number for error packets buffered in the storage device 105 reaches the predetermined number, a packet reconstruction procedure is performed to the buffered error packets to reconstruct a correct packet.

Figure 2:
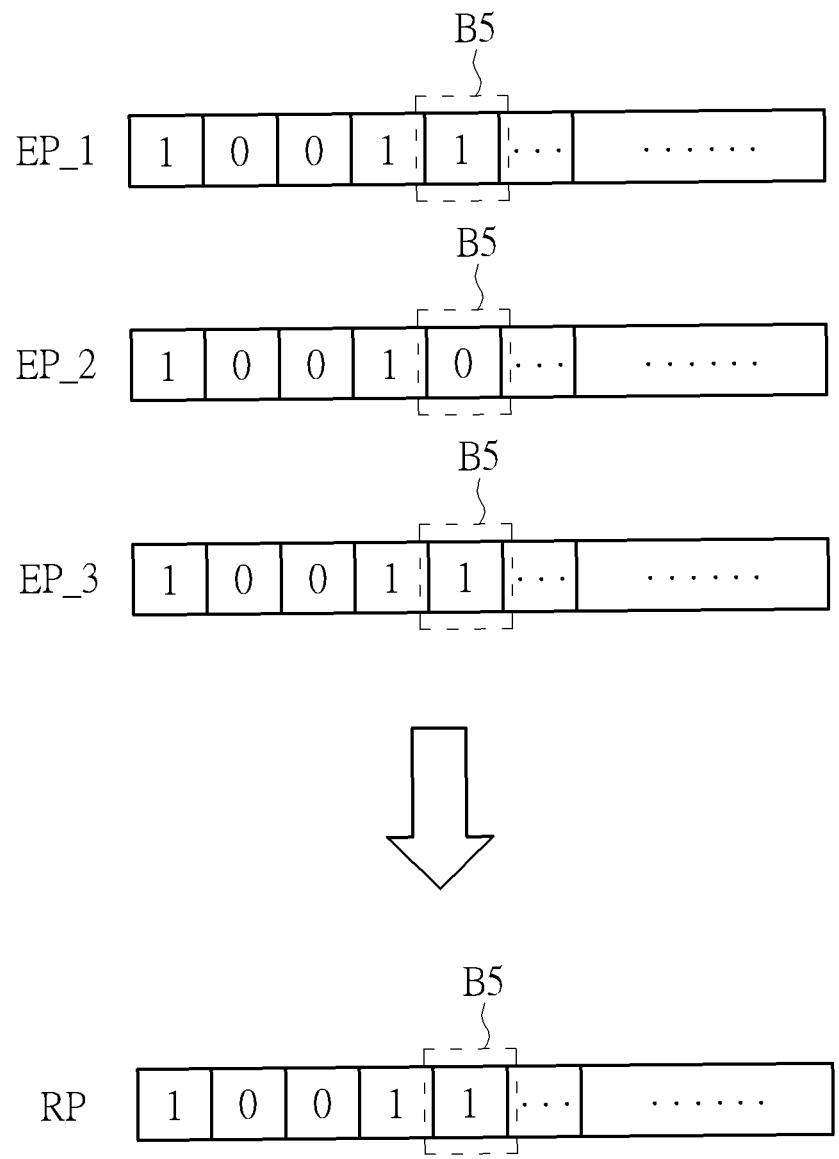
FIG. 2-FIG. 4 are schematic diagrams illustrating packet reconstruction procedures according to different embodiments of the present invention.
Figure 3:
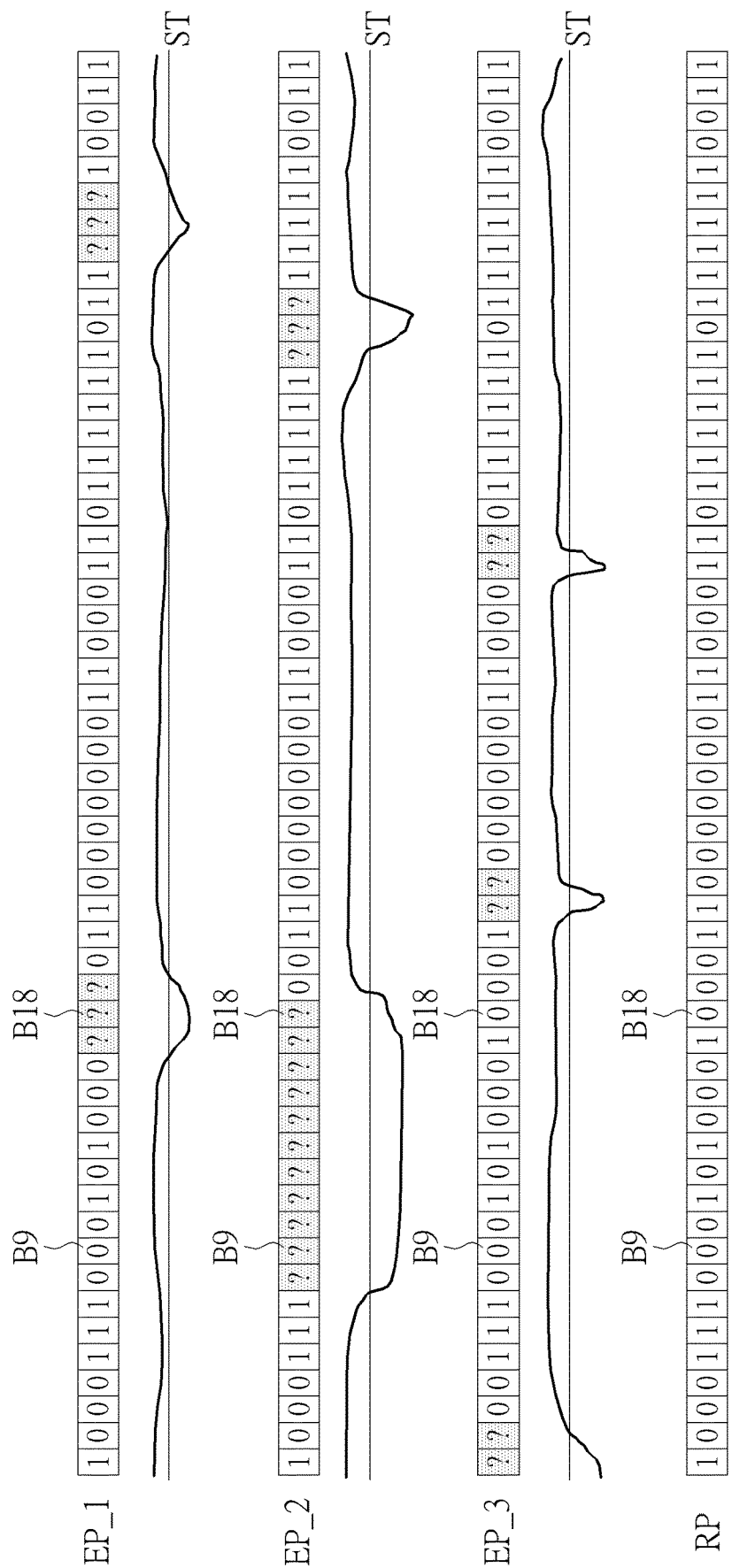
Figure 4:
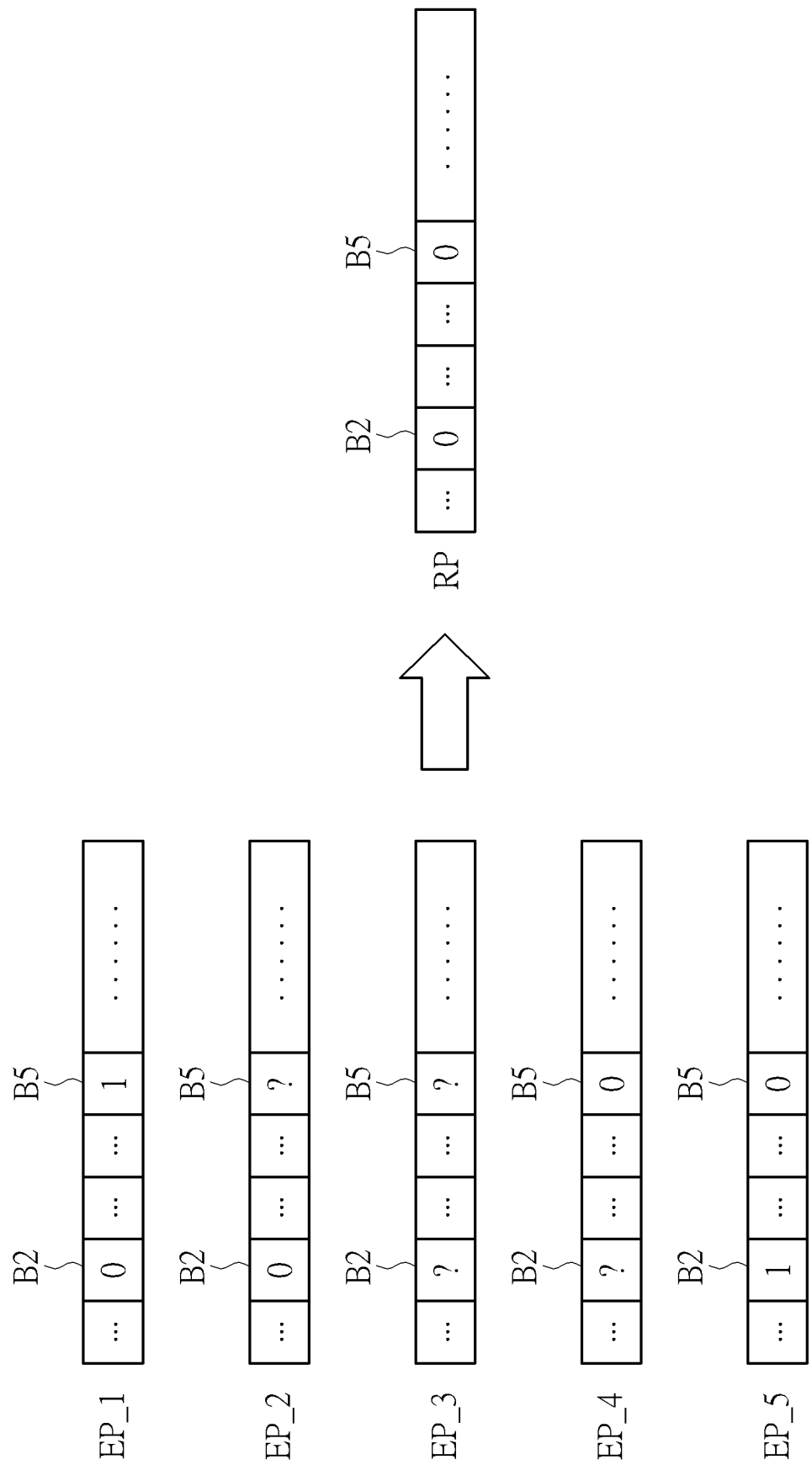

FIG. 2-FIG. 4 are schematic diagrams illustrating packet reconstruction procedures according to different embodiments of the present invention. Please note, the embodiments in FIG. 2-FIG. 4 are only examples and do not mean to limit the scope of the present invention. Any method which can reach the same function should also fall in the scope of the present invention.

In the embodiment in FIG. 2, the packet reconstruction procedure comprises the steps of: counting numbers of the bits in a corresponding location (or having a corresponding order) of each one of the error packet, for each one of the bit values; and selecting the bit value of at least the bit with a maximum one of the numbers as a bit value of a corresponding bit of the reconstruction packet.

For more detail, in the embodiment of FIG. 2, the number of error packets are 3. Also, the control circuit 101 calculates the bit B5 (a fifth bit) in each of the error packets EP_1, EP_2, and EP_3 to obtain the number of the bit B5 with bit value 1 and the number of the bit B5 with bit value 0. In the embodiment of FIG. 2, the number of the bit B5 with a bit value 1 is 2, and the number of the bit B5 with a bit value 0 is 1. Accordingly, the bit value 1 corresponding to the maximum number 2 is selected as a bit value of the bit B5 of the reconstructed packet RP.

The method illustrated in FIG. 2 can be performed to each bit in the error packet, or be performed to only partial of the bits in the error packet. Also, the number of the error packets which can be buffered can be set to an even number, such step can make sure that numbers of different bit values of the bits at the corresponding location are different.

In some cases, numbers of different bit values of the bits at the corresponding location are the same. For example, the number of error packets is 4 and a number of the bits B5 with a logic value 1 and a number of the bits B5 with a logic value 0 are both 2. In such case, the control circuit 101 waits for another error packet and also determines the bit value of the bit B5 of the another error packet. Such steps can be repeated until numbers of different bit values of the bits at the corresponding location are different.

In the embodiment of FIG. 3, the packet reconstruction procedure comprises the steps of: determining signal qualities of the bits in a corresponding location (or named a corresponding order) of each one of the error packet; and selecting the bit value of the bit in the corresponding location as a bit value of a corresponding bit of the reconstruction packet based on the signal quality.

For more detail, in the embodiment of FIG. 3, the symbol "?" mean the bit in the error packet EP_1, EP_2 or EP_3 has a poor signal quality (i.e. the signal quality is lower than a signal quality threshold ST). On the contrary, if the bit in the error packet EP_1, EP_2 or EP_3 has a signal quality higher than the signal quality threshold, it means the bit is a good bit which can be identified whether the bit has a logic value 1 or a logic value 0. Therefore, for example, the signal qualities of the bits B9 in a ninth location or a ninth order (i.e. a ninth bit) in the error packet EP_1, EP_2 or EP_3 are determined. After that, the bit values of the bits B9 in the error packets EP_2 and EP_3 are selected as a bit value of a corresponding bit B9 of the reconstruction packet RP, since signal qualities of the bits B9 in the error packets EP_2 and EP_3 are higher than the signal quality threshold ST.

In some cases, numbers of different bit values of the bits at the corresponding location are the same. For example, the bit B9 of the error packets EP_1, EP_2 respectively has a logic value 1 and a logic value 0 but the bit B9 of the error packet EP_3 has a poor signal quality. In such case, the control circuit 101 waits for another error packet and also determines the signal quality and the bit value of the bit B9 of the another error packet. Such steps can be repeated until numbers of different bit values of the bits at the corresponding location are different.

The method illustrated in FIG. 3 can be performed to each bit in the error packet, or be performed to only partial of the bit in the error packet.

In the embodiment in FIG. 4, the packet reconstruction procedure comprises the steps of: determining signal qualities of the bits of each one of the error packets; selecting at least one candidate bit from the bits based on the signal qualities; counting numbers of the candidate bits in a corresponding location (or named a corresponding order) of each one of the error packets, for each one of the bit values; and selecting the bit value of the candidate bit with a maximum one of the numbers as a bit value of a corresponding bit of the reconstruction packet.

For more detail, in the embodiment of FIG. 4, signal qualities of the bits of each one of the error packets EP_1-EP_5 are determined. Then, at least one candidate bit is selected from the bits based on the signal qualities. For example, the bits B2 in the error packet EP_1 and EP_2, EP_5, which have high signal qualities, are selected as candidate bits and the bits B5 in the error packet EP_1 and EP_4, EP_5, which have high signal qualities, are selected as candidate bits.

After that, the numbers of the candidate bits in a corresponding location of each one of the error packet are counted, for each one of the bit values. Then the bit value of the candidate bit with a maximum one of the numbers is selected as a bit value of a corresponding bit of the reconstruction packet.

For more detail, in the embodiment of FIG. 4, the control circuit 101 calculates the bit B2 in each of the error packets EP_1, EP_2, and EP_5 to obtain the number of the bit B2 with bit value 1 and the number of the bit B2 with bit value 0. In the embodiment of FIG. 4, the number of the bit B2 with a bit value 0 is 2, and the number of the bit B2 with a bit value 1 is 1. Accordingly, the bit value 0 corresponding to the maximum number 2 is selected as a bit value of the bit B2 of the reconstructed packet RP. Similarly, the control circuit 101 calculates the bit B5 in each of the error packets EP_1, EP_4, and EP_5 to obtain the number of the bit B5 with bit value 1 and the number of the bit B5 with bit value 0. In the embodiment of FIG. 4, the number of the bit B5 with a bit value 0 is 2, and the number of the bit B5 with a bit value 1 is 1. Accordingly, the bit value 0 corresponding to the maximum number 2 is selected as a bit value of the bit B5 of the reconstructed packet RP.

Figure 5:
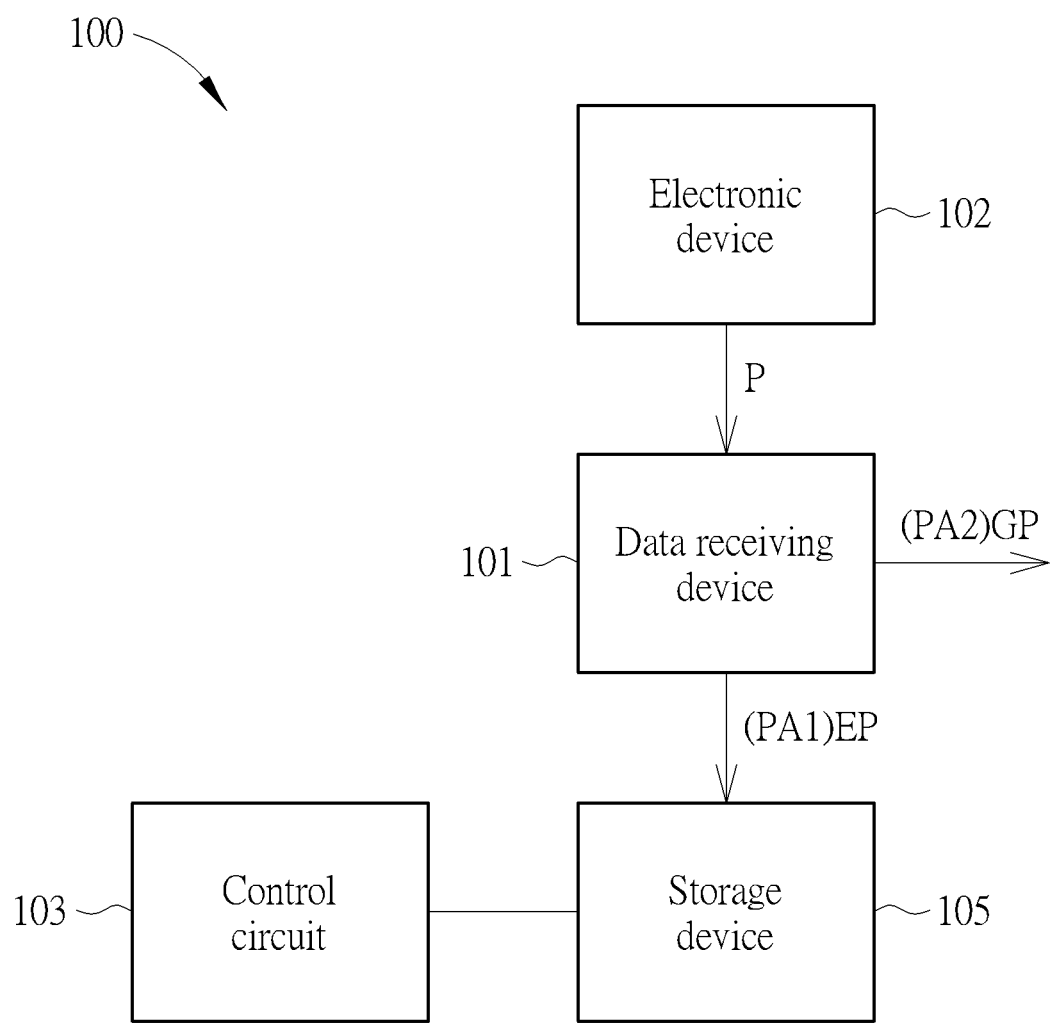
FIG. 5 is a block diagram illustrating a wireless communication device according to another embodiment of the present invention.

FIG. 5 is a block diagram illustrating a wireless communication device according to one embodiment of the present invention. As stated in the embodiment of FIG. 1, the control circuit 103 determines whether the packet P is an error packet EP or not. If the packet P is an error packet EP, the error packet EP is buffered to the storage device 105. In the embodiment of FIG. 5, the good packet GP, which means the packet P passed the error checking procedure, is transmitted by another path.

As shown in FIG. 5, the data receiving device 101 has a first path PA1 and a second path PA2. If the packet P is determined as the error packet EP, the error packet is transmitted by the first path P1 to the storage device 105. Also, if the packet P is determined as the good packet GP, the error packet is transmitted by the second path P2 to the storage device 105. The good packet GP can be applied for further processing except the packet reconstruction. The further processing can mean, for example, if the good packet GP is a voice packet, it is combined with other good packets to form voice data which can be heard by a user. However, the further processing is not limited to the examples illustrated here.

The above-mentioned embodiments can be applied but not limited to a TWS wireless earphone. Further, the above-mentioned packets can be replaced by any other kind of data group. Besides, the above-mentioned bit can be replaced by any other data unit, thus the bit value can be replaced by any other data value.

Figure 6:
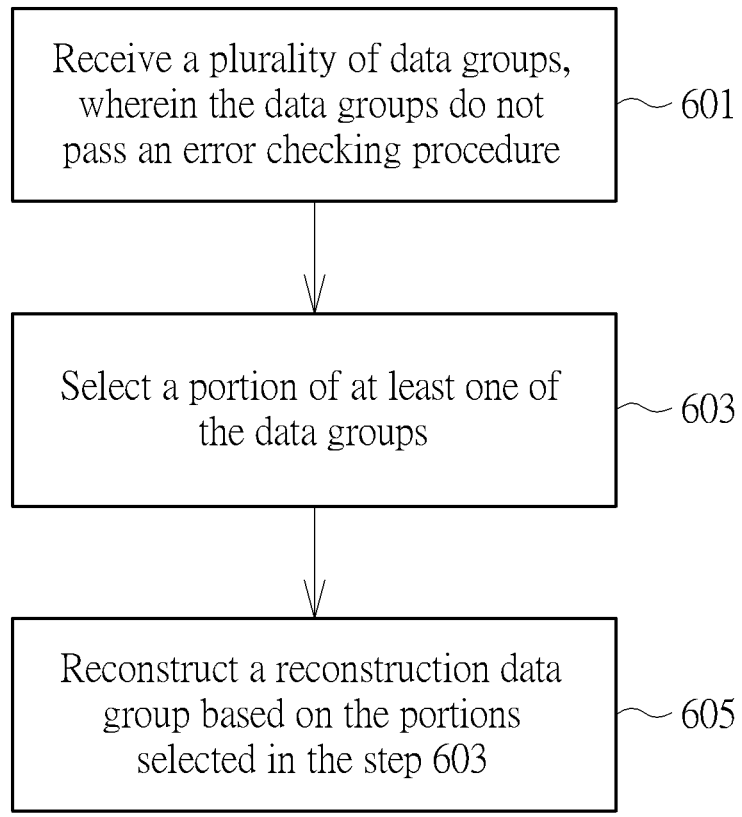
FIG. 6 is a flow chart illustrating a wireless communication method according to one embodiment of the present invention.

Therefore, a wireless communication method in FIG. 6 can be acquired based on above-mentioned embodiments. Such wireless communication method can be performed by executing at least one program stored in the storage device.

The steps in FIG. 6 can comprise:

Step 601

Receive a plurality of data groups, wherein the data groups do not pass an error checking procedure. For example, receiving the packets which does not CRC (i.e. error packets) by the data receiving device 101.

Step 603

Select a portion of at least one of the data groups. For example, select the portion by the steps shown in FIG. 2, FIG. 3 or FIG. 4.

Step 605

Reconstruct a reconstruction data group based on the portions selected in the step 603. For example, reconstruct the reconstruction packet RP by the steps shown in FIG. 2, FIG. 3 or FIG. 4.

Other detail steps can be acquired in above-mentioned embodiments, thus are omitted for brevity here.

In view of above-mentioned embodiments, the packet can be reconstruct based on error packets, thus the performance of the TWS wireless earphone or any other electronic device with a small size can be improved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A non-transitory computer readable medium storing at least one program, wherein a wireless communication method is performed while the program is executed, the wireless communication method comprising:
   (a) receiving a plurality of data groups, wherein the data groups do not pass an error checking procedure;
   (b) selecting a portion of at least one of the data groups; and
   (c) reconstructing a reconstruction data group based on the portions selected in the step (b);
   wherein each one of the data groups comprises a plurality of data units and each one of the data units has a data value, where the step (b) comprises:
   (b1) determining signal qualities of the data units in a corresponding location of each one of the data groups; and
   (b2) selecting the data value of one of the data units which is in the corresponding location as a data value of a corresponding data unit of the reconstruction data group based on the signal qualities.

2. The non-transitory computer readable medium of claim 1, wherein the data groups are packets, the data units are bits, and the data values are bit values.

3. The non-transitory computer readable medium of claim 1, wherein the step (a) receives the data groups by a first path of a data receiving device, where the wireless communication method further comprises:
   transmitting data groups which pass the error checking procedure by a second path of the data receiving device.

4. The non-transitory computer readable medium of claim 3, wherein the data groups and the reconstruction data group are packets.

5. The non-transitory computer readable medium of claim 1, wherein the data groups are packets, where the wireless communication method is applied to a Bluetooth device and the step (a) receives the data groups which are re-transmitted when the Bluetooth device uses an Asynchronous Connectionless Link protocol.

6. A wireless communication device, comprising:
   a control circuit; and
   a storage device;
   wherein a wireless communication method is performed while at least one program is executed by the control circuit, and the wireless communication method comprises:
   (a) receiving a plurality of data groups by the control circuit, wherein the data groups do not pass an error checking procedure;
   (b) selecting a portion of at least one of the data groups; and
   (c) reconstructing a reconstruction data group based on the portions selected in the step (b);
   wherein each one of the data groups comprises a plurality of data units and each one of the data units has a data value, where the step (b) comprises:
   determining signal qualities of the data units in a corresponding location of each one of the data groups; and
   selecting the data value of one of the data units as a data value of a corresponding data unit of the reconstruction data group based on the signal qualities.

7. The wireless communication device of claim 6, wherein the data groups are packets, the data units are bits, and the data values are bit values.

8. The wireless communication device of claim 6, further comprising a data receiving device comprising a first path and a second path, wherein the step (a) receives the data groups by the first path, where the wireless communication method further comprises:
   transmitting data groups which pass the error checking procedure by a second path of the data receiving device.

9. The wireless communication device of claim 8, wherein the data groups and the reconstruction data group are packets.

10. The wireless communication device of claim 6, wherein the data groups are packets and the wireless communication device is a Bluetooth device, where the step (a) receives the data groups which are re-transmitted when the wireless communication device uses an Asynchronous Connectionless Link protocol.

11. A non-transitory computer readable medium storing at least one program, wherein a wireless communication method is performed while the program is executed, the wireless communication method comprising:
 (a) receiving a plurality of data groups, wherein the data groups do not pass an error checking procedure;
 (b) selecting a portion of at least one of the data groups; and
 (c) reconstructing a reconstruction data group based on the portions selected in the step (b)
 wherein each one of the data groups comprises a plurality of data units and each one of the data units has a data value, where the step (b) comprises:
 determining signal qualities of the data units of each one of the data groups;
 selecting at least one candidate data unit from the data units based on the signal qualities;
 counting numbers of the candidate data units in a corresponding location of each one of the data groups, for each one of the data values; and
 selecting the data value of one of the candidate data units which corresponds to a maximum one of the numbers as a data value of a corresponding data unit of the reconstruction data group.

12. The non-transitory computer readable medium of claim 11, wherein the data groups are packets, the data units are bits, and the data values are bit values.

13. A wireless communication device, comprising:
 a control circuit; and
 a storage device;
 wherein a wireless communication method is performed while at least one program is executed by the control circuit, and the wireless communication method comprises:
 (a) receiving a plurality of data groups by the control circuit, wherein the data groups do not pass an error checking procedure;
 (b) selecting a portion of at least one of the data groups; and
 (c) reconstructing a reconstruction data group based on the portions selected in the step (b),
 wherein each one of the data groups comprises a plurality of data units and each one of the data units has a data value, where the step (b) comprises:
 determining signal qualities of the data units of each one of the data groups;
 selecting at least one candidate data unit from the data units based on the signal qualities;
 counting numbers of the candidate data units in a corresponding location of each one of the data groups, for each one of the data values; and
 selecting the data value of one of the candidate data units which corresponds to a maximum one of the numbers as a data value of a corresponding data unit of the reconstruction data group.

14. The wireless communication device of claim 13, wherein the data groups are packets, the data units are bits, and the data values are bit values.

* * * * *